UNITED STATES PATENT OFFICE.

ALEXANDRE BIGOT, OF PARIS, FRANCE.

MANUFACTURE OF GLAZED OR ENAMELED CERAMIC WARE.

No. 838,496. Specification of Letters Patent. Patented Dec. 11, 1906.

Application filed February 17, 1903. Serial No. 143,858.

*To all whom it may concern:*

Be it known that I, ALEXANDRE BIGOT, of No. 13 Rue des Petites Ecuries, Paris, France, have invented a new and useful Process of Manufacture of Glazed or Enameled Ceramic Ware, which invention is fully set forth in the following specification.

In the manufacture of pottery by pressing as it is practiced at the present day the glaze or enamel is applied after the article has been pressed, either immediately before or after firing.

I propose to unite in one operation the processes of forming and glazing or enameling, to suppress the drying after these operations, and to make a single firing serve, and this I succeed in doing by selecting suitable ceramic pastes and glazes or enamels.

The present invention relates to the manufacture of pottery by this combination of operations, as I will proceed to describe.

By "enamel" I mean vitrifiable material which remains opaque after the firing, and by "glaze" I mean a coating which remains transparent or translucent and forms a sort of varnish. The vitrifiable material is arranged in a layer of suitable thickness at the bottom of the press-mold. Upon it is placed the necessary quantity of the ceramic paste, terra-cotta, stoneware-paste, clay, porcelain-paste, or the like, care being taken that the so-called "paste" or material has been brought to the condition of a dry or damp powder. The two layers are now submitted to the pressing action, and there is thus obtained an article covered with the vitrifiable material, which may be transferred at once to the furnace, thereby avoiding the step of stoving or drying.

The operation just described may be reversed—that is to say, the ceramic paste may be placed at the bottom of the mold, while the vitrifiable material is placed on the top of the paste. Between these two layers one or several layers of white or colored vitrifiable material may be interposed. This process gives rise to a number of applications susceptible of two classifications.

A. Ware of various forms without parts in intaglio or relief.

First, white ware: There are used a white opaque enamel and a white or colored paste or a transparent glaze and a white paste, or a vitreous enamel, a thin layer of white paste, forming a slip, and a colored paste.

Second, colored ware: A colored enamel may be used or a transparent glaze and a layer of colored paste or enamel, and the ceramic paste.

Third, decorated ware: White or colored enamels are used in juxtaposition, permitting several tints on the same article.

Fourth, flashed ware: In the preceding cases the enamels and glazes give generally plain tints. Flashing glazes may be applied by the same process and produce after firing their characteristic effects of intermingling tints, uneven tints, crystallization effects, and the like.

B. Ware having parts in intaglio or relief.

The four preceding examples may be applied to ware having patterns, hollows, reliefs, and the like. Moreover, by taking advantages of the differences of level in the mold the reliefs may be covered or the hollows filled with different enamels, glazes, or pastes, so as to produce the design in different colors. For compressing at the same time the vitrifiable substances and powdered pastes I use known apparatus, preferably hydraulic presses. The process is applicable to all glazed or enameled ceramic products, but has special utility for manufacture of earthenware and porcelain. It has also the advantage that enamels or glazes soluble in water may be used, and the operation of fritting to make them insoluble is avoided.

Having thus described the nature of my said invention and the best means I know of carrying the same into practical effect, I claim—

1. The improved process of making articles of pottery consisting in superposing in a mold layers of ceramic material in a slightly-damp powdered condition and of an enameling or glazing material, applying pressure to impart to the materials the shape of the mold, and then immediately firing the molded article without preliminary drying.

2. The improved process of making articles of pottery consisting in superposing in a mold layers of ceramic material in a slightly damp powdered condition, a glazing or enameling material and an interposed layer of coloring material, applying pressure to impart to the materials the shape of the mold, and then immediately firing the molded article without preliminary drying.

In witness whereof I have hereunto signed my name, this 5th day of February, 1903, in the presence of two subscribing witnesses.

ALEXANDRE BIGOT.

Witnesses:
 ARMENGAUD, Jeune,
 MARAT ARMENGAUD, Jeune.